US012605839B2

(12) United States Patent (10) Patent No.: US 12,605,839 B2
Jeon (45) Date of Patent: Apr. 21, 2026

(54) WASTE DISPOSAL AUTOMATION ROBOT SYSTEM

(71) Applicant: BRILS Co., Ltd., Incheon (KR)

(72) Inventor: Jin Jeon, Incheon (KR)

(73) Assignee: BRILS Co., Ltd., Incheon (KR)

( * ) Notice: Subject to any disclaimer, the term of this patent is extended or adjusted under 35 U.S.C. 154(b) by 0 days.

(21) Appl. No.: 18/775,055

(22) Filed: Jul. 17, 2024

(65) Prior Publication Data

US 2025/0100146 A1      Mar. 27, 2025

(30) Foreign Application Priority Data

Sep. 25, 2023      (KR) ......................... 10-2023-0128016

(51) Int. Cl.
  *B25J 9/16*        (2006.01)
  *B25J 11/00*       (2006.01)
  *B25J 15/06*       (2006.01)
(52) U.S. Cl.
  CPC ........... B25J 9/1679 (2013.01); B25J 9/1697 (2013.01); B25J 11/008 (2013.01); B25J 15/0616 (2013.01)
(58) Field of Classification Search
  CPC ...... B25J 9/1679; B25J 9/1697; B25J 11/008; B25J 15/0616; B25J 19/023
  See application file for complete search history.

(56) References Cited

U.S. PATENT DOCUMENTS

| | | | | |
|---|---|---|---|---|
| 2021/0122046 A1* | 4/2021 | Sun | ......................... | B25J 9/1612 |
| 2021/0387808 A1* | 12/2021 | Kalouche | ............. | G06Q 10/083 |
| 2023/0286019 A1* | 9/2023 | Ryan | ....................... | B07C 3/082 |

FOREIGN PATENT DOCUMENTS

| | | |
|---|---|---|
| KR | 10-2011-0095700 A | 8/2011 |
| KR | 10-2015-0130042 A | 11/2015 |
| KR | 10-1779296 B1 | 9/2017 |
| KR | 10-2350345 B1 | 1/2022 |
| KR | 10-2422251 B1 | 7/2022 |
| KR | 10-2023-0047233 A | 4/2023 |
| KR | 10-2023-0074264 A | 5/2023 |

* cited by examiner

*Primary Examiner* — Dylan M Katz
(74) *Attorney, Agent, or Firm* — Bridgeway IP Law Group, PLLC; Jihun Kim

(57) ABSTRACT

Embodiments relate to a waste disposal automation robot system that can detect the position and shape of a medical waste box loaded in a roll container using a collaborative robot and a 3D vision system, and then can automatically convey and load the box onto a conveyor. The system includes a first 3D vision camera performing 3D vision scanning of the medical waste box loaded in the roll container, a second 3D vision camera performing 3D vision scanning of the medical waste box loaded in the conveyor from the roll container, and a collaborative robot using the scanning data received from each of the first 3D vision camera and the second 3D vision camera to convey and load the medical waste box loaded in the roll container to the conveyor.

8 Claims, 5 Drawing Sheets

10

1

100

P1

300

P2

WASTE DISPOSAL AUTOMATION ROBOT SYSTEM

CROSS-REFERENCE TO RELATED APPLICATIONS

This application claims the priority of Korean Patent Application No. 10-2023-0128016 filed on Sep. 25, 2023, in the Korean Intellectual Property Office, the disclosure of which is incorporated herein by reference.

TECHNICAL FIELD

The present disclosure relates to a waste disposal automation robot system, and more specifically, to a waste disposal automation robot system for automatically conveying and loading a medical waste box loaded in a roll container onto a conveyor.

BACKGROUND

Waste discharged from a medical site such as a hospital, including a glove, a syringe, an ampoule, gauze, or a paper diaper, is contaminated with a patient's blood or body fluid, raising concerns about infection. Therefore, this waste is distinguished from general waste and subjected to sterilization before disposal.

As a result, in the medical site, medical waste is collected in a dedicated waste collection container, is transferred to a separate packaging bag, sealed, and sent to a waste disposal company for processing.

While there are not many disposal companies that handle infectious waste, opportunities to use a disposable medical instrument such as a syringe or a paper diaper are increasing from the viewpoint of safety, hygiene, medical practice, and nursing efficiency. Consequently, the amount of medical waste discharged in the medical site is increasing every year.

In addition, a worker who collects and processes medical waste uses a steel conveyance cart to gather medical waste collected within a discharge facility. However, this presents various issues, such as the potential for contamination, increased physical strain on the worker due to the cart's weight, and a longer conveyance distance depending on the amount of waste.

The description provided above as a related art of the present disclosure is for helping understand the background of the present disclosure and should not be construed as being included in the related art known by those skilled in the art.

PRIOR ART DOCUMENT

Patent Document (Patent Document 1) Korean Patent No. 10-2422251 (2022 Jul. 19)
(Patent Document 2) Korean Patent No. 10-1779296 (2017 Sep. 26)

SUMMARY

In view of the above, the present disclosure provides a waste disposal automation robot system that can detect the position and shape of a medical waste box loaded in a roll container using a collaborative robot and a 3D vision system, and then can automatically convey and load the box onto a conveyor.

Technical objects to be achieved by the present disclosure are not limited to those described above, and other technical objects that are not mentioned above may also be clearly understood from the descriptions given below by those skilled in the art to which the present disclosure belongs.

The present disclosure provides a waste disposal automation robot system including a first 3D vision camera performing 3D vision scanning of the medical waste box loaded in the roll container, a second 3D vision camera performing 3D vision scanning of the medical waste box loaded in the conveyor from the roll container, and a collaborative robot using the scanning data received from each of the first 3D vision camera and the second 3D vision camera to convey and load the medical waste box loaded in the roll container to the conveyor.

In an embodiment, the collaborative robot may detect the position and shape of the medical waste box loaded in the roll container using the scanning data received from the first 3D vision camera.

In an embodiment, the collaborative robot may sequentially convey and load the medical waste box, loaded in the roll container, onto the conveyor according to a preset working order.

In an embodiment, the collaborative robot may convey and load medical waste boxes loaded at the top of the roll container to the conveyor in a preset working order based on importance.

In an embodiment, the collaborative robot may convey and load each layer of medical waste boxes stacked in multiple layers in the roll container to the conveyor in a preset working order based on importance.

In an embodiment, when a high-importance medical waste box is located below a low-importance medical waste box, the collaborative robot may rearrange the medical waste boxes loaded in the roll container so that the high-importance medical waste box is located in an upper layer while temporarily conveying all or part of the low-importance medical waste boxes that are located above the layer where the high-importance medical waste box is located to the conveyor and then temporarily conveying the boxes to the roll container, and then re-determine the working order.

In an embodiment, when the medical waste boxes that should have been first conveyed to the conveyor according to the importance are found in the roll container, the collaborative robot may temporarily arrange the boxes that are first loaded in the conveyor within the conveyor, then conveys the boxes found in the roll container to the conveyor, and rearrange the boxes that are temporarily arranged in the conveyor.

In an embodiment, the collaborative robot may include an articulated robot, a gripper moved by the articulated robot, and suction cups installed in n*n rows along a lower surface of the gripper, and fastening the medical waste box using negative pressure.

In an embodiment, the articulated robot may move the gripper so that the number of suction cups that are completely seated without being partially separated from an upper surface of the medical waste box is maximized, and at the same time, the gravity center of the medical waste box is close to the center of the gripper.

In an embodiment, the articulated robot may read inclination of the medical waste box, which is a conveyance target, loaded in the roll container, using the scanning data received from the first 3D vision camera, tilt the gripper at an inclination angle that is the same as inclination of an upper surface of the inclined medical waste box and then seat the gripper on the medical waste box, and release the tilting of the gripper during a conveyance process after fastening the medical waste box so that the medical waste box is conveyed at a normal angle.

In an embodiment, when the shape of the medical waste box, which is a conveyance target, is read as shapes other than a hexahedron using the scanning data received from the first 3D vision camera, the articulated robot may tilt the gripper at the inclination angle that is the same as the inclination of the upper surface of the medical waste box formed of an inclined surface and then seat the gripper on the medical waste box, release a fixed state of the gripper before fastening by the suction cup, and then fix the tilting of the gripper again in the case of lifting the medical waste box after fastening by the suction cup.

In an embodiment, the articulated robot may build a database and store the adsorption limits of the suction cup depending on the weight of the medical waste box for each tilting angle of the gripper, determine the weight distribution of each medical waste box, which is a conveyance target loaded in the roll container, and then convey the box only when it may be conveyed.

Advantageous Effects

According to an aspect of the present disclosure, it is configured to detect the position and shape of a medical waste box loaded in a roll container using a collaborative robot and a 3D vision system, and then automatically convey and load the box onto a conveyor. This contributes to improving safe and hygienic handling, safety, and efficiency when conveying and loading the box onto the conveyor.

Further, the safety of workers can be guaranteed and medical institutions can efficiently manage medical waste.

Effects of the present disclosure are not limited to the above-mentioned effects, and various effects will be clearly understood by those skilled in the art from the following claims.

DETAILED DESCRIPTION

Figure 1:
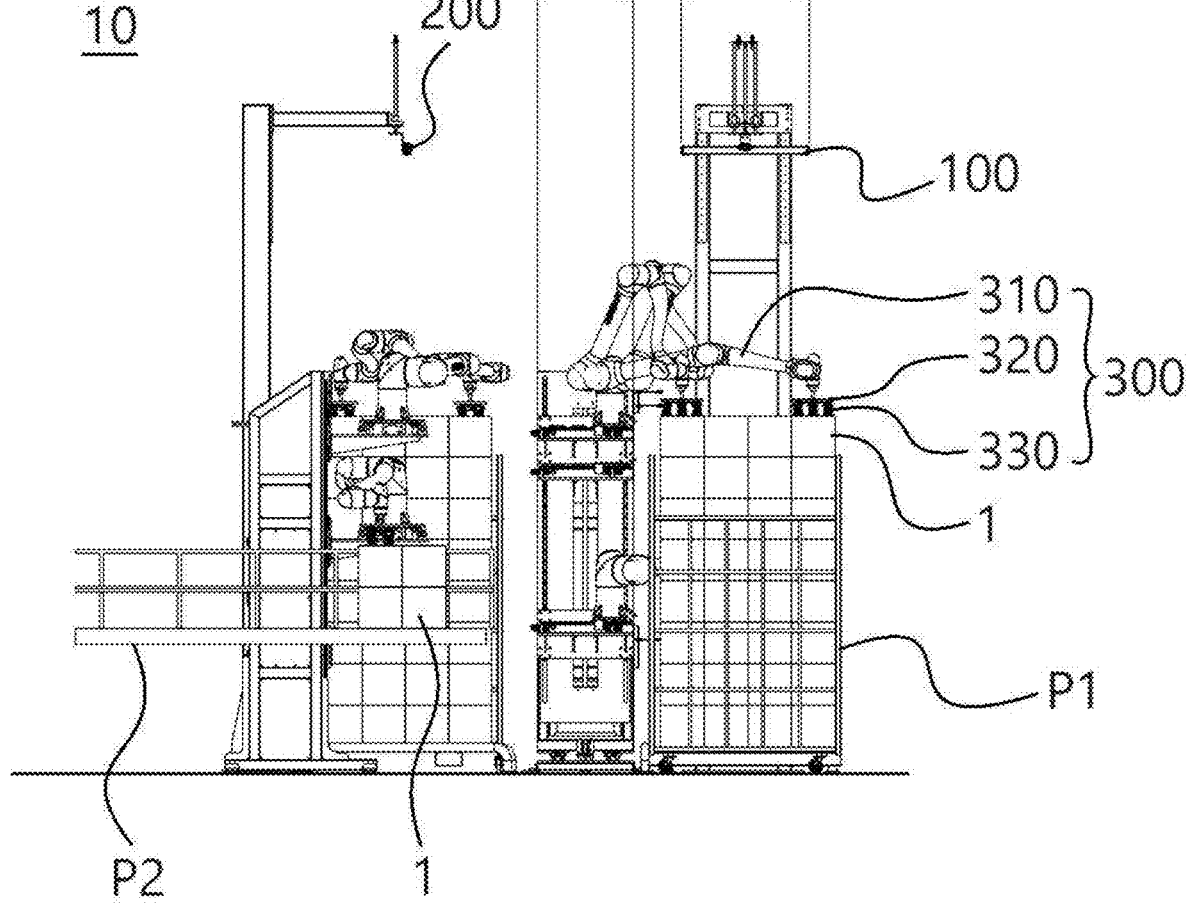
FIGS. 1 and 2 are diagrams showing the schematic configuration of a waste disposal automation robot system according to an embodiment of the present disclosure.

The present disclosure will be described below in detail with reference to the accompanying drawings, which show by way of example specific embodiments in which the present disclosure may be practiced. These embodiments are described in detail to enable those skilled in the art to practice the present disclosure. It should be understood that various embodiments of the present disclosure are different from one another but are not necessarily mutually exclusive. For example, specific shapes, structures and characteristics described herein may be implemented in various ways without departing from the spirit and scope of the present disclosure. Further, it should be understood that the position or arrangement of individual components within each disclosed embodiment may be changed without departing from the spirit and scope of the present disclosure. Accordingly, the detailed description set forth below is not intended to be taken in a limiting sense, and the scope of the present disclosure is defined only by the appended claims and equivalents thereof. Like reference numerals refer to like parts throughout various figures and embodiments of the present disclosure.

Hereinafter, preferred embodiments of the present disclosure will be described in detail with reference to the accompanying drawings.

Figure 2:
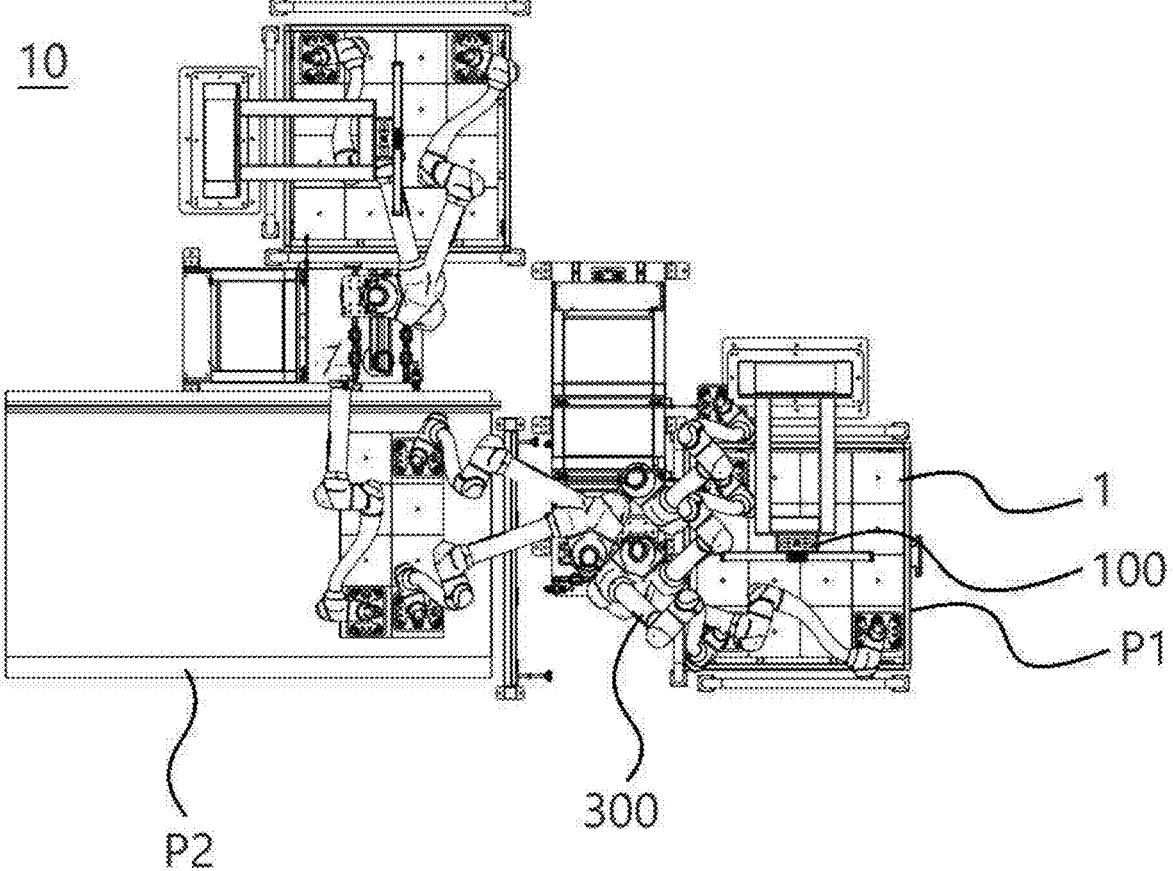

FIGS. 1 and 2 are diagrams showing the schematic configuration of a waste disposal automation robot system according to an embodiment of the present disclosure.

Referring to FIGS. 1 and 2, the waste disposal automation robot system 10 according to an embodiment of the present disclosure includes a first 3D vision camera 100, a second 3D vision camera 200, and a collaborative robot 300.

When a worker brings a roll container P1 loaded with a medical waste box 1 to a work position, the first 3D vision camera 100 performs the 3D vision scanning of the medical waste box 1 loaded in the roll container P1 and transmits generated scanning data to the collaborative robot 300.

In an embodiment, the first 3D vision camera 100 may identify the medical waste box 1 through a 3D vision scanning method, and may usually recognize the medical waste box 1 loaded at the top. However, the camera may also cumulatively identify the distribution of the medical waste boxes 1 stacked on each layer in the process of loading the medical waste box 1.

The second 3D vision camera 200 performs the 3D vision scanning of the medical waste box 1 loaded in a conveyor P2 from the roll container P1 and transmits generated scanning data to the collaborative robot 300.

The collaborative robot 300 uses the scanning data received from each of the first 3D vision camera 100 and the second 3D vision camera 200 to convey and load the medical waste box 1 loaded in the roll container P1 to the conveyor P2 according to a preset working order (e.g. importance criteria or simple loading order, etc.).

In an embodiment, the collaborative robot 300 may detect the position and shape of the medical waste box 1 loaded in the roll container P1 using the scanning data received from the first 3D vision camera 100.

In an embodiment, the collaborative robot 300 may sequentially convey and load the medical waste box 1, loaded in the roll container P1, onto the conveyor P2 according to a preset working order (e.g. an order from the waste box 1 loaded at the top to the waste box 1 at the bottom, or an order from the waste box 1 loaded on the left to the waste box 1 loaded on the right, etc.).

In an embodiment, the collaborative robot 300 may convey and load medical waste boxes 1 loaded at the top of the roll container P1 to the conveyor P2 in a preset working order based on importance.

In an embodiment, the collaborative robot 300 may convey and load each layer of medical waste boxes 1 stacked in multiple layers in the roll container P1 to the conveyor P2 in a preset working order based on importance (e.g. the order of the oldest disposal date, etc.).

In an embodiment, when a high-importance medical waste box 1 is located below a low-importance medical waste box 1, the collaborative robot 300 may rearrange the medical waste boxes 1 loaded in the roll container P1 so that the high-importance medical waste box 1 is located in an upper layer while temporarily conveying all or part of the low-importance medical waste boxes 1 that are located above the layer where the high-importance medical waste box 1 is located to the conveyor P2 and then temporarily conveying the boxes to the roll container P1, and then may re-determine the working order.

In an embodiment, when the medical waste boxes 1 that should have been first conveyed to the conveyor P2 according to the importance are found in the roll container P1, the collaborative robot 300 may temporarily arrange the boxes that are first loaded in the conveyor P2 within the conveyor P2, then convey the boxes found in the roll container P1 to the conveyor P2, and rearrange the boxes that are temporarily arranged in the conveyor P2.

In an embodiment, the collaborative robot 300 may include an articulated robot 310, a gripper 320, and a suction cup 330.

The articulated robot 310 is an articulated robot device equipped with at least one joint, and moves the gripper 320 in various directions and angles.

Figure 3:
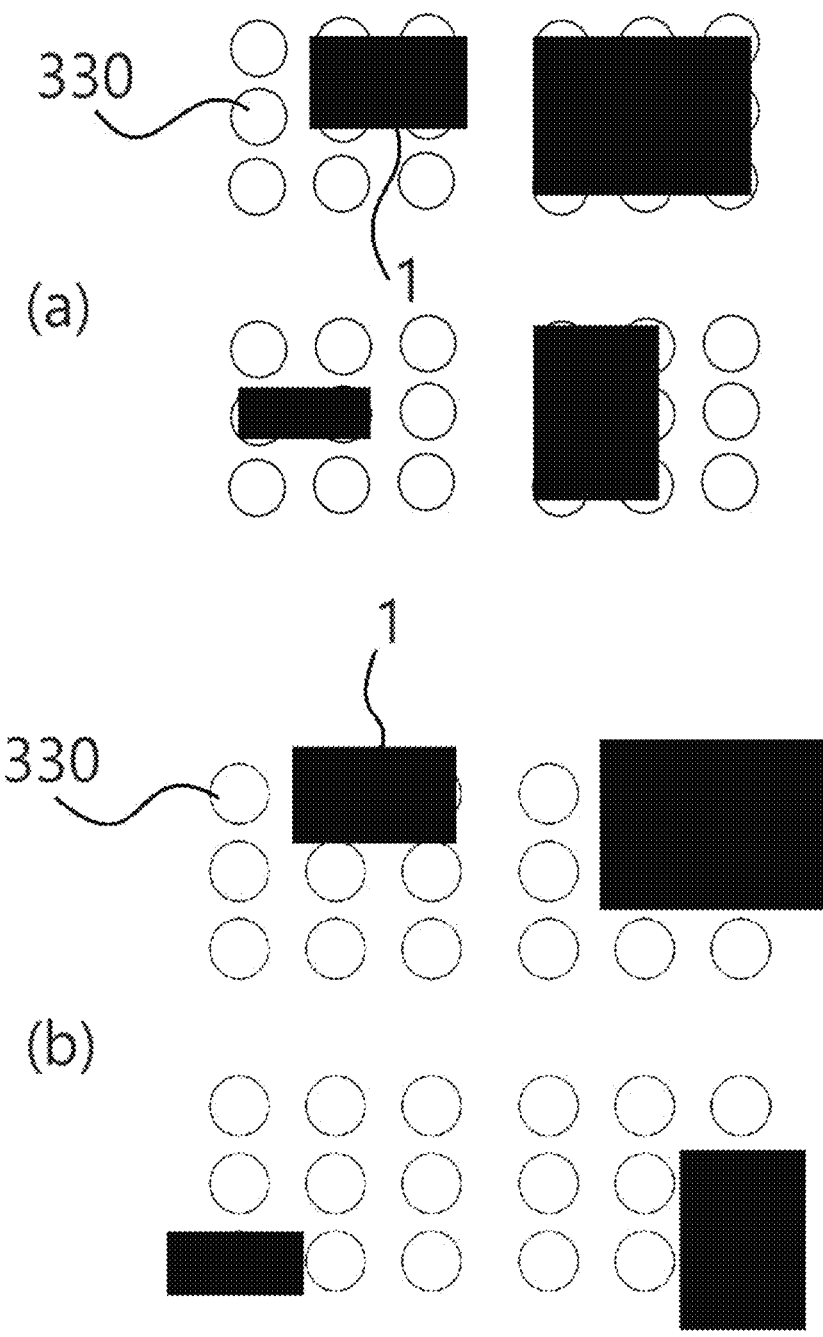
FIG. 3 is a diagram showing incorrect fastening examples using a suction cup of FIG. 1.
Figure 4:
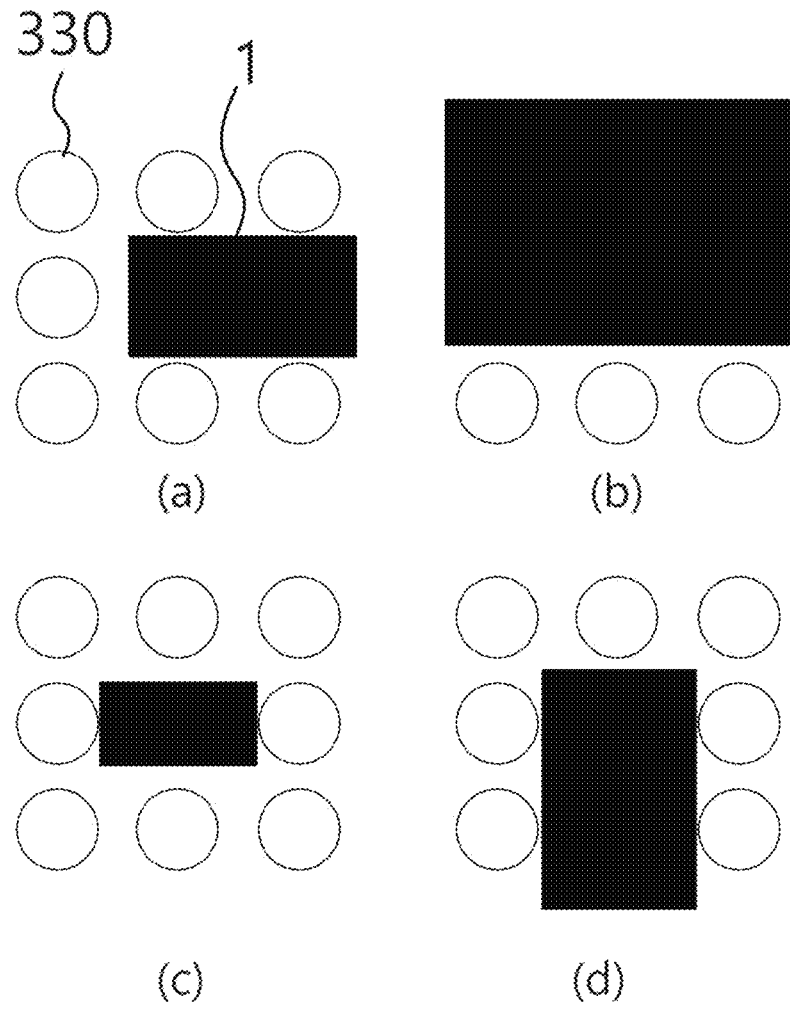
FIG. 4 is a diagram showing correct fastening examples using the suction cup of FIG. 1.

The gripper 320 is moved by the articulated robot 310, and suction cups 330 are installed in n*n rows along a lower surface thereof as shown in FIGS. 3 and 4.

The suction cups 330 are installed in n*n rows along the lower surface of the gripper 320, and fasten the medical waste box 1 using negative pressure.

As shown in FIG. 4, the angle and movement degree of the suction cup 330 should be adjusted by the gripper 320 so that only the suction cup capable of suction without exceeding the area of the medical waste box 1 is fastened to the medical waste box 1.

In an embodiment, the articulated robot 310 may move the gripper 320 so that the number of suction cups 330 that are completely seated without being partially separated from an upper surface of the medical waste box 1 (the case of (a), and (b) of FIG. 3) is maximized, and at the same time, the gravity center of the medical waste box 1 is close to the center of the gripper 320 (the case of (a), (b), (c), and (d) of FIG. 4).

Figure 5:
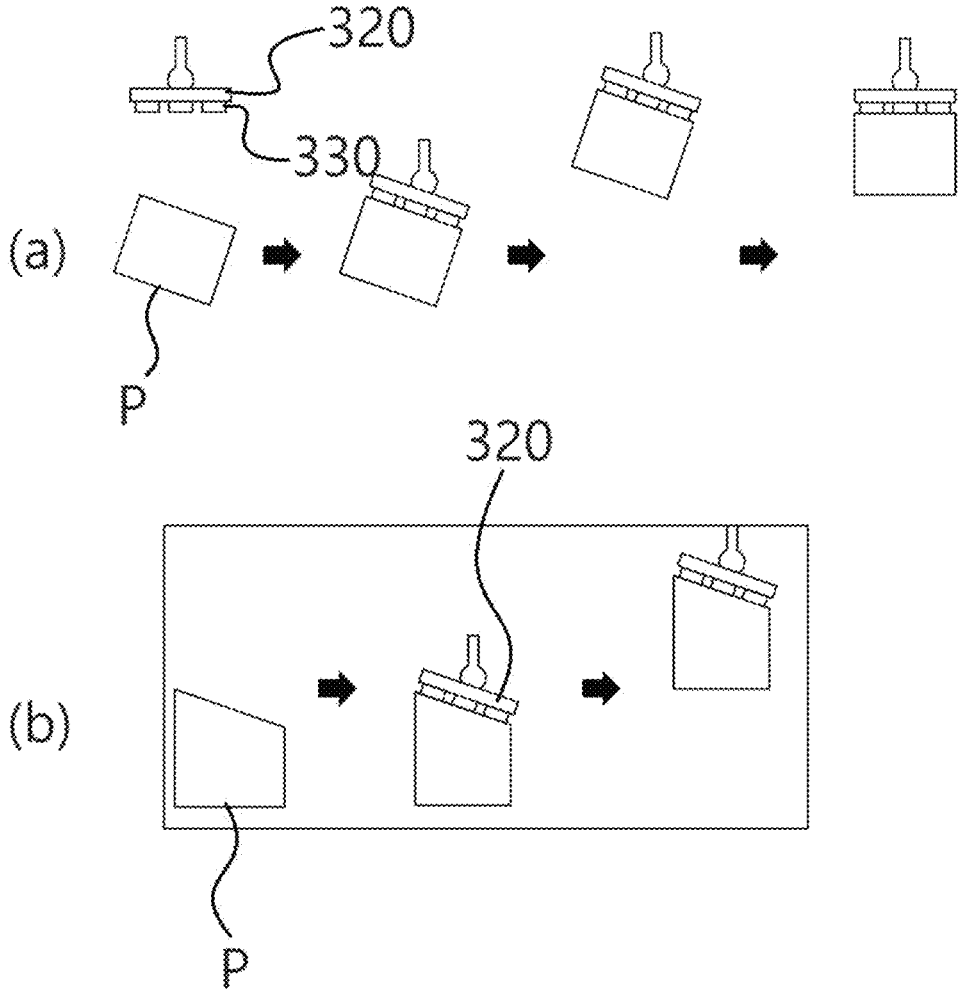
FIG. 5 is a diagram showing fastening method examples of a medical waste box using a collaborative robot of FIG. 1.

In an embodiment, the articulated robot 310 may read (the case of (a) of FIG. 5) the inclination of the medical waste box 1, which is a conveyance target, loaded in the roll container P1, using the scanning data received from the first 3D vision camera 100, tilt the gripper 320 at an inclination angle that is the same as the inclination of the upper surface of the inclined medical waste box 1 and then seat the gripper on the medical waste box 1, and release the tilting of the gripper 320 during a conveyance process after fastening the medical waste box 1 so that the medical waste box 1 is conveyed at a normal angle.

In an embodiment, when the shape of the medical waste box 1, which is the conveyance target, is read (the case of (b) of FIG. 5) as shapes other than a hexahedron using the scanning data received from the first 3D vision camera 100, the articulated robot 310 may tilt the gripper 320 at the inclination angle that is the same as the inclination of the upper surface of the medical waste box 1 formed of an inclined surface and then seat the gripper on the medical waste box 1, release the fixed state of the gripper 320 before fastening by the suction cup 330, and then fix the tilting of the gripper 320 again in the case of lifting the medical waste box 1 after fastening by the suction cup 330, thereby preventing items in the medical waste box 1 from leaning.

In an embodiment, the articulated robot 310 may build a database and store the adsorption limits of the suction cup 330 (e.g. 100 kg when adsorbed horizontally, 50 kg when adsorbed at a 30-degree diagonal, etc.) depending on the weight of the medical waste box 1 for each tilting angle of the gripper 320, determine the weight distribution of each medical waste box 1, which is a conveyance target loaded in the roll container P1, and then convey the box only when it may be conveyed.

Depending on the weight distribution in the medical waste box 1 or the shape or adsorption position of the medical waste box 1, the medical waste box 1 may be tilted by the center of gravity during a lifting process.

To this end, the collaborative robot 300 may be further provided with a balance device (not shown in the drawing for convenience of description) that fixes a tilting angle after adsorption to prevent the medical waste box 1 from tilting.

The waste disposal automation robot system 10 according to an embodiment of the present disclosure is configured to detect the position and shape of a medical waste box loaded in a roll container using a collaborative robot and a 3D vision system, and then automatically convey and load the box onto a conveyor. This contributes to improving safe and hygienic handling, safety, and efficiency when conveying and loading the box onto the conveyor.

Further, the safety of workers can be guaranteed and medical institutions can efficiently manage medical waste.

The above description is merely exemplary description of the technical scope of the present disclosure, and it will be understood by those skilled in the art that various changes and modifications can be made without departing from original characteristics of the present disclosure. Therefore, the aforementioned embodiments should be understood as illustrative in all respects and not as restrictive. For example, each component described as a single unit may be implemented in a distributed manner, and components described as distributed may also be implemented in a combined form.

The protection scope of the present disclosure is indicated by the scope of the claims described below rather than a detailed description, and all changes or modifications derived from claims and equivalences thereof should be construed as being included in the scope of the present disclosure.

DETAILED DESCRIPTION OF MAIN ELEMENTS

10: waste disposal automation robot system
100: first 3D vision camera
200: second 3D vision camera
300: collaborative robot
What is claimed is:

1. A waste disposal automation robot system for automatically conveying and loading a medical waste box loaded in a roll container onto a conveyor, the waste disposal automation robot system comprising:

a first 3D vision camera configured to perform 3D vision scanning of the medical waste box loaded in the roll container;

a second 3D vision camera configured to perform 3D vision scanning of the medical waste box loaded in the conveyor; and a collaborative robot configured to convey and load the medical waste box loaded in the roll container to the conveyor using data of the 3D vision scanning received from each of the first 3D vision camera and the second 3D vision camera, wherein the collaborative robot is configured to sequentially convey and load medical waste boxes, loaded in the roll container, onto the conveyor according to a first preset working order, and wherein the collaborative robot is configured to convey and load each layer of the medical waste boxes stacked in multiple layers in the roll container to the conveyor in a second preset working order based on importance.

2. The waste disposal automation robot system of claim 1, wherein the collaborative robot is further configured to detect a position and a shape of the medical waste box loaded in the roll container using the data of the 3D vision scanning received from the first 3D vision camera.

3. The waste disposal automation robot system of claim 1, wherein the collaborative robot is further configured to convey and load the medical waste boxes positioned at a top layer of the multiple layers to the conveyor in the second preset working order based on importance.

4. The waste disposal automation robot system of claim 1, wherein, when high-importance medical waste boxes are positioned below low-importance medical waste boxes, the collaborative robot is configured to:

rearrange the high-importance medical waste boxes and the low-importance medical waste boxes loaded in the roll container by conveying all or some of the low-importance medical waste boxes positioned above the high-importance medical waste boxes to the conveyor and then conveying the all or some of the low-importance medical waste boxes back to the roll container so that the high-importance medical waste boxes are positioned above the low-importance medical waste boxes; and re-determine a working order.

5. The waste disposal automation robot system of claim 1, wherein, when the medical waste boxes that should have been first conveyed to the conveyor according to the importance are found in the roll container, the collaborative robot is configured to arrange the medical waste boxes that are first loaded in the conveyor within the conveyor, then convey the medical waste boxes found in the roll container to the conveyor, and rearrange the medical waste boxes that are first loaded in the conveyor.

6. The waste disposal automation robot system of claim 1, wherein the collaborative robot comprises:

an articulated robot;

a gripper configured to be moved by the articulated robot; and suction cups arranged in n*n rows along a lower surface of the gripper and configured to fasten the medical waste box using negative pressure.

7. The waste disposal automation robot system of claim 6, wherein the articulated robot is configured to:

read inclination of the medical waste box, which is a conveyance target, loaded in the roll container, using the data of the 3D vision scanning received from the first 3D vision camera, tilt the gripper at an inclination angle that is same as an inclination angle of an upper surface of the medical waste box and then seat the gripper on the medical waste box, and release the tilting of the gripper while conveying the medical waste box after fastening the medical waste box so that the medical waste box is conveyed at a normal angle.

8. The waste disposal automation robot system of claim 6, wherein, when a shape of the medical waste box, which is a conveyance target, is a shape other than a hexahedron according to the data of the 3D vision scanning received from the first 3D vision camera, the articulated robot is configured to:

tilt the gripper at an inclination angle that is same as an inclination angle of an upper surface of the medical waste box, the upper surface being an inclined surface, and then seat the gripper on the medical waste box, release a fixed state of the gripper before fastening by the suction cups, and then fix the tilting of the gripper again to lift the medical waste box after fastening by the suction cups.

\* \* \* \* \*